United States Patent [19]

Baus

[11] Patent Number: 4,780,599

[45] Date of Patent: Oct. 25, 1988

[54] APPARATUS FOR RETRIEVING STORED INFORMATION ABOUT VARIOUS ITEMS IN RESPONSE TO CODING ON THE ITEMS

[76] Inventor: Heinz G. Baus, 35 Wartbodenstrasse, CH-3626 Hünibach-Thun, Switzerland

[21] Appl. No.: 750,039

[22] Filed: Jun. 28, 1985

[30] Foreign Application Priority Data

Jun. 30, 1984 [DE] Fed. Rep. of Germany ....... 3424162

[51] Int. Cl.⁴ .......................... G06F 15/40; G06K 9/18
[52] U.S. Cl. ..................................... 235/383; 235/385; 235/375
[58] Field of Search ............... 235/383, 375, 462, 473, 235/472, 378, 385, 419, 376, 381, 463; 358/341, 343, 342; 364/403; 340/825.35

[56] References Cited

U.S. PATENT DOCUMENTS

| | | | |
|---|---|---|---|
| 4,070,649 | 1/1978 | Wright, Jr. et al. | 364/709 |
| 4,118,687 | 10/1978 | McWaters et al. | 235/437 |
| 4,139,149 | 2/1979 | Crepeau et al. | 235/383 |
| 4,251,798 | 2/1981 | Swartz et al. | 235/472 |
| 4,286,145 | 8/1981 | Palmer | 235/462 |
| 4,335,302 | 6/1982 | Robillard | 235/462 |
| 4,360,798 | 11/1982 | Swartz et al. | 235/463 |
| 4,373,133 | 2/1983 | Clyne et al. | 235/385 |
| 4,415,065 | 11/1983 | Sandstedt | 235/383 |
| 4,419,573 | 12/1983 | von Geldern | 235/385 |
| 4,463,389 | 7/1984 | Golding | 358/343 |
| 4,481,412 | 11/1984 | Fields | 235/472 |
| 4,521,677 | 6/1985 | Sarwin | 235/383 |
| 4,628,193 | 12/1986 | Blum | 235/375 |
| 4,654,514 | 3/1987 | Watson et al. | 235/383 |

FOREIGN PATENT DOCUMENTS

| | | |
|---|---|---|
| 2744612 | 4/1978 | Fed. Rep. of Germany. |
| 3109599 | 2/1982 | Fed. Rep. of Germany. |
| 2838243 | 6/1982 | Fed. Rep. of Germany. |

Primary Examiner—Raymond F. Cardillo
Assistant Examiner—Robert A. Weinhardt
Attorney, Agent, or Firm—Foley & Lardner, Schwartz, Jeffery, Schwaab, Mack, Blumenthal & Evans

[57] ABSTRACT

An apparatus for storing and releasing information contains at least one reading device for reading codings arranged upon, or associated with, saleable goods. Also provided is a storage unit for storing information and a corresponding output unit. The apparatus offers to users, in department stores or the like and directly and reliably, specific information concerning products to be sold. The data processing unit comprises a programmable coding unit by means of which, on the one hand, address signals for the information and, on the other hand, associated codings are stored. By use of a reading device, and through the coding unit, the desired information is called upon from the storage unit and is made accessible on the output unit.

13 Claims, 2 Drawing Sheets

APPARATUS FOR RETRIEVING STORED INFORMATION ABOUT VARIOUS ITEMS IN RESPONSE TO CODING ON THE ITEMS

BACKGROUND OF THE INVENTION

1. Field of the invention

The invention relates to an apparatus for storing and releasing pieces of information, which apparatus includes: a reading device for reading coding which may be arranged upon, or in the vicinity of, goods or other objects or can be associated therewith; a data-processing unit; and a storage unit for the information, this information being adapted to be called up, according to the coding read by the reading device, by an address signal, and to be made accessible by means of an output unit.

2. Description of the prior art

In department stores, supermarkets, etc. large numbers of products are offered for sale to the customers in appropriate display arrangements such as shelves, racks, etc. and the customer often feels a great need for information regarding product application, use and material. The information carried on the packaging is often incomplete and fails to provide the customer with all of the desired information. Moreover at present days, because of pollution, packaging is becoming increasingly smaller or is being eliminated altogether, in which case no information can be provided and, in the case of small products, for example screws in particular, direct information cannot be provided. Up to now, therefore, suitable sales counsellors having the required technical knowledge have been necessary, resulting in additional staff and costs. Again in exhibitions, museums, etc. there is often a considerable need for information regarding the objects displayed or other articles.

German OS No. 31 09 599 (U.S. Pat. No. 4,419,573) describes a sales device for goods having bar code identification. This sales device comprises bar code reading units for scanning the codes applied to the goods or packages, so that goods purchased by customers can be identified at the cashier's desk and priced to complete the sales procedure. Fresh goods, such as meat or vegetables, which can be sold loose, can also be provided with bar codes, use being made of preprinted labels with progressively numbered codes. In this case a salesperson must associate the stored information with the product by actuating a keyboard. Mistakes or unauthorized handling are easily possible. Each identification must be specific as regards the type, amount and size of the product. The codes detected by the reading device are processed by a data-processing unit and the stored price of the product and, if necessary, the weight and other information are called up, are displayed in a cash register, and are printed upon a receipt to be handed to the customer.

A device for reading bar codes is described in German patent No. 28 38 243 (U.S. Pat. No. 4,251,798). The reading device contains a light-source and an optical system scanning the light produced by the light source, to direct it to the bar coding to be detected, and to direct the reflected light to a transducer. This is followed by conversion into electrical signals with a suitable evaluating circuit. In the case of a known reading unit, designed as a manual scanner, the bar codes can also be detected even if the scanner is not set accurately upon them. Such reading devices, or those operating in a comparable manner, are stipulated as being known for the proposed apparatus and are also not to be developed.

German OS No. 27 44 612 (U.S. Pat. No. 4,118,687) describes a portable optical symbol-recognition system containing a display device and a reading device to be held manually by the user. Only the information detected by the reading device can be displayed for control or inspection purposes. A cassette recorder for storing the codes detected with the reading device is described. The known symbol-recognition system is used by store personnel or the like for taking stock of the number and type of available goods, more particularly for inventory purposes. The cassette recorder is also used to store the number of goods or the like detected. This known system is not suitable for storing and releasing large amounts of information, especially pictorial representations, spot-advertising or the like.

Finally, U.S. Pat. No. 4,070,649 describes an input and output apparatus, and a corresponding method, by means of which information recorded by the movement of a person's hand can be recognized and displayed. To this end, a writing surface is required to represent the symbols, means being provided to detect the movement of the person's hand in the conversion of the symbols. Large quantities of information, especially specific information concerning the products, cannot be reliably conveyed with an apparatus of this kind.

It is an object of the present invention to provide an apparatus of the kind described above wherein large quantities of information can be conveyed reliably to a user at low production and operating costs. When the apparatus is used in department stores or the like places, it is possible to offer to the customer quantities of specific information concerning the products, such as data regarding the nature of the products, applications, material, processing installations, explanations of accessories, etc. In this case, codes hitherto applied to the goods merely for pricing or taking inventory are used for the purpose of conveying direct information. Even when the apparatus is used at exhibitions, in museums, etc., it is to be possible to convey quantities of information reliably to the users by simple manipulation. Simple manipulation is to ensure that even an unskilled user can call up the desired information. The apparatus is of an inexpensive construction and can be adapted to service conditions at low cost. The apparatus is built on the modular concept, using commercially available components, for examples monitors, loudspeakers, video disc units or the like, with a view to low production costs. Furthermore, information already stored is easily associated with other goods or the like. It is to be possible to handle and allocate a new code to information already stored with only a small amount of labour and equipment. The apparatus as a whole permits flexible handling.

In order to achieve this object, it is provided that the data processing unit comprise a programmable coding unit; that by means of the coding unit there can be stored on the one hand, address-signals for the information in the storage unit and, on the other hand, codes associated with one or more products; and that, by means of the reading device, and through the coding unit, the information can be called up from the storage unit and can be represented or made accessible on the output unit.

The proposed device is an autonomous system and makes it possible to convey specific information concerning products to the interested person in a manner which is particularly reliable and easily adaptable to the relevant conditions. The coding associated with the products, hitherto used exclusively for pricing and monitoring the flow of goods, can now be used in a surprisingly simple manner to deliver information to the customers. The coding is more particularly in the form of line or bar code but, within the scope of this invention, suitably coded magnetic tapes, magnetic coatings or the like may be provided. Line codes, in which the width and arrangement of the lines, and the spaces between them, determine the nature of the information, can be easily and reliably read by an optical reading device. Devices of this kind, also known as scanning guns, are light and have a small volume and may easily be held in the customer's hand. A wireless transmission system may be provided between the reading device and the data processing unit, thus eliminating costly cabling and conductors. Transmission may, however, also be carried out electrically through conductors or optically through optical fibres, in which case the reading device is preferably connected to the data processing unit by a flexible lead, as is usual in the case of telephone equipment. The data processing unit contains suitable converters or coding units, so that the storage unit can be triggered in accordance with the information detected by the reading device. Within the scope of the invention, the coding unit is freely programmable and contains a memory in which adress signals, on the one hand, and codes, on the other hand, are associated with each other. A freely programmable memory and converter makes possible direct and rapid allocation and, if necessary, changing of these signals. Specific information concerning products and containing data regarding the nature, application, use, material, etc., is fed into the storage unit. The information may also contain processing instructions, explanations of accessories and data regarding the location and finding of other comparable products in the store. According to the invention, the proposed product information and display system has high information density which is particularly easy to adapt to the relevant requirements. The storage unit is preferably designed as a video recorder, slide protector, a magnetic disc or video disc storage unit or the like for pictorial information. A specific address signal is associated with each piece of information, and this signal can be interrogated and called up in dependence upon the code detected by the reading device, thus ensuring particularly rapid access to the desired information. The output unit is matched to the type of information contained in the storage unit and is preferably in the form of a monitor and/or printer and/or loudspeaker or the like.

In one particular embodiment, the reading device is incorporated into a compact hand unit comprising a transmitter for wireless transmission of the code detected to a receiver in the data processing unit. Transmission may be effected by radio waves, especially in the VHF range, or by ultra-sound or infrared radiation. In any case, wireless transmission greatly facilitates handling since, for one thing, it eliminates the costly laying of cables and, for another, the customer's freedom of movement is practically unrestricted.

In order to obtain a particularly simple assembly, it is proposed that the reading device be arranged stationarily, more particularly incorporated into the display unit. In this embodiment, the line coded products are moved past the stationary reading device. It is expressly pointed out at this time that, according to this invention, the product information and display system is a complete unit consisting of a display unit for the products, a reading device, a data processing unit and an output unit. The system is, so to speak, completely prepared, requiring only that an electrical cable be plugged into a main connection. This applies to all embodiments regardless of the transmission system between the reading device and the data processing unit. The system according to the invention can therefore be installed, without special prior knowledge, at any desired location in a department store or the like. Costly assembly operations are avoided.

In another embodiment, the reading device and the output unit are combined into a compact hand device. The information called up according to the invention can thus be offered directly to the customer, a specific number of such hand devices being preferably provided. Without interfering with each other several customers can simultaneously call up the desired pieces of information. There is no need to emphasize that a picture of adequate accuracy can be offered on today's small screens measuring only a few centimeters diagonally. In the case of an audio, output, a small loudspeaker can be incorporated into the hand device. It is also possible to incorporate, into the hand device, in a special embodiment, the data processing and storage units. Modern data processing and storage technologies provide extremely high information density with light weight and small volume. If the data processing and storage units are arranged separately from the hand device, the information contained in the storage unit is also conveyed with the above-mentioned wireless transmission system. In all of the embodiments, a largely autonomous hand device, easily actuated by the customer, and of small weight and volume is provided.

In order to keep the cost of identifying the products down, use is made of the same coding both to call up the information explained above and to issue price lists. In other words, the existing codes are used, according to the invention, thus effecting considerable savings in cost. The data processing unit contains the coding unit with appropriate converters which convert the information associated with the product into addresses for controlling the storage unit. In this connection, it is particularly important that the converter also include a number of different codings of similar products in order to produce an address signal for calling up information regarding the corresponding group of products. According to the invention, the converter is freely programmable, so that, when a new product is taken up, or in the event of a change in the number of an article, simple and reliable allocation of the necessary address signal can be undertaken. The storage unit, more particularly a laser video or a video disc, need therefore not be changed when one or more products are changed; the same video disc can easily be re-used.

In order to achieve particularly simple and reliable input and allocation of codes to the adress signals, a control unit is provided by means of which the code detected by a reading device is allocated to an address signal in the coding unit. To this end, the control unit may comprise keys or the like for feeding-in the address signals after the feed-in, combination and allocation to the code detected by the reading device is carried out. In one alternative and significant embodiment, the storage unit is controlled by the control unit in such a manner until the desired information is given up in the output unit. According to the invention, the address signal corresponding to the information is now determined with the control unit and the code detected is passed to the coding unit. Incorrect inputs are practically excluded. It is important, according to the invention, that a number of different codes can also be allocated to one address signal, even subsequently by reason of the free programmability of the coding unit.

According to another embodiment, the coding unit comprises a replaceable memory. This memory may be programmed externally, for example in the cental office of a department store chain, in the manner desired if, for example, new products are to be included in the sales programme. These replaceable memories may then easily be inserted, in the branches, into the coding units according to the invention, or may replace existing units there. In this connection, magnetic floppy discs are particularly favourable for floppy drives.

In another embodiment, control means are provided whereby a user may call up further information from the storage unit. If the information initially requested with the reading device is of little interest to the user, he can resort immediately to the control means and trigger another piece of information. For example, if a general spot-advertisement is offered initially, this can be passed over by actuating the control means and another very special spot advertisement can be offered to the user. It is to be remembered that, according to the invention, the pieces of information in the storage unit, and the corresponding address signals, have a specific hierarchical association with each other. Thus, according to the invention, address-signals and/or functional signals are listed consecutively and can be interrogated one after the other. It is also possible to pass over preceding or subsequent storage locations by means of branches, pointers or jump instructions.

According to one particular embodiment, the address signals for the pieces of information are stored in the coding memory in such a manner that a user may call up the next piece of information or the piece of information already offered previously. Thus if the information is stored in the form of pictures, a user can easily call up once more pictures already seen, for example in order to obtain parallel information regarding a specific product in addition to the information already obtained. By means of a central computer, preferably in the form of a microprocessor, the address signals or functional signals listed, according to the invention, in the coding unit, are interrogated consecutively. Moreover this list according to the invention also receives socalled pointers so that, if required, it can jump over subsequent storage locations or can also travel back. With the control means, a user may call up the next picture, or the next picture sequence, directly from the storage unit. The user's interest is thus maintained uninterruptedly and he does not tire of an unduly long presentation or one which he does not want.

According to a particular embodiment, an intermediate memory is provided from which audio or textual information can be called up and, more particularly, fed, through a mixer stage, to the output unit, this intermediate memory being triggerable by means of the address or functional signals. Even subsequent additional information can be mixed-in, if necessary, in this surprisingly simple manner. To this end there is no need to prepare any new video disc or similar storage medium. This significant embodiment makes it possible to support a still picture with audio or textual signals. Such audio signals are preferably also stored in the storage medium, more particularly the video disc. To this end, use may be made, according to the invention, in storing pictures according to television standards, of the free lines between consecutive pictures or half-pictures. If a picture sequence is played as soon as the apparatus is started, audio signals can simultaneously be played into the intermediate memory. If a still picture is then displayed on the monitor or a television set, the stored audio signal is called up, according to the invention, from the intermediate memory. The free lines according to known television standards for video signals are used, according to the invention, for audio signals which, after intermediate storage, are simultaneously interrogated and released with the relevant still picture. In addition to this, the invention also covers an intermediate memory of this kind in which audio signals, for example in the form of entertainment music, are stored. To this end, use may be made of a cassette recorder of conventional design. The acoustic output, in conjunction with the video output, has the advantage of particularly direct addressing and influencing by the user.

In one embodiment, the storage unit is preceded by a standardized interface, more particularly a V-24 interface. The storage unit and the output unit may be made up from commercially available components, to wit a laser video disc unit or video recorder and television sets or monitors, imparting considerable cost advantages for the apparatus as a whole.

SUMMARY OF THE INVENTION

Accordingly, the above objects may be attained with a apparatus according to the invention for use in storing and releasing information, apparatus including a reading device for reading codings applying to saleable goods, a data processing unit having a first storage unit for storing information adapted to be retrieved in response to address signals corresponding to the codings read by the reading device, and an output unit for making the retrieved information available to a user, the improvement wherein the data processing unit essentially comprises: a programmable coding unit including means for producing the address signals in response to the codings read by the reading device, and means for supplying the address signals to the first storage unit; the storage unit comprising means responsive to the address signals for transmitting, to the output unit, information stored in the first storage unit and corresponding to the address signals whereby the output unit makes the information available to the user.

BRIEF DESCRIPTION OF THE DRAWINGS

Embodiments of the invention are described hereinafter with reference to the appended drawings wherein.

DESCRIPTION OF THE PREFERRED EMBODIMENTS

Figure 1:
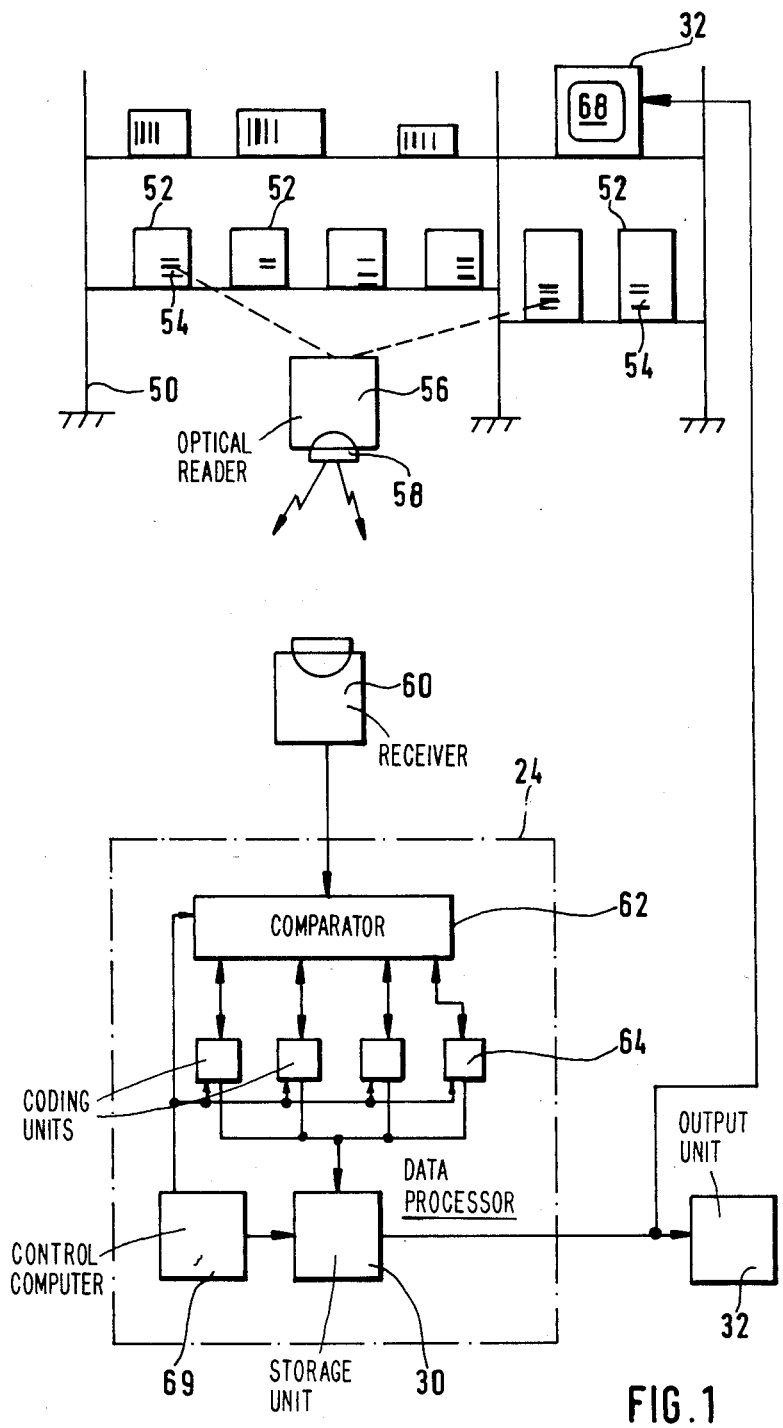
FIG. 1 is a schematic illustration, in block diagram form, of an apparatus according to a first embodiment.

In the embodiment of the apparatus illustrated in FIG. 1, is a block diagram, several saleable products 52, 52', 52" are shown in a display shelf arrangement 50. Each product has a code 54, 54', 54" in the form of a bar code consisting of a plurality of lines of different width, spaced differently apart, etc.. The code corresponds more particularly to the number of the article and to data regarding weight, price, etc.. Thus for different products, the coding is also different. An optical reading device 56, which can be moved in the usual manner, as required, past the coding 54 on the relevant products 52, is used to detect the coding and to convert it into corresponding electrical signals. The reading device 56 is, according to the invention, in the form of a scanning gun and, being a compact, light hand unit, can easily be held in the hand of a user or customer and moved over the coding 54 of the product of interest. The scanning gun, or compact reading device 56, contains suitable electronic parts, batteries, a power supply etc. in order to ensure reliable conversion of the coding into electrical signals. For transmitting the signals obtained with the reading device 56 to a data processing unit 24, there is provided a wireless transmission system comprising a transmitter 58 and a receiver 60. The transmitter 58 is incorporated into the reading device 56 which is in the form of a scanning gun and is light and small, The signals received by the receiver 60 are applied to a comparator 62 of the data processing unit 24. This comparator 62 is in communication with a coding unit having converters 64 suitable to release address signals sent to a subsequent output unit 32. The converters are freely programmable in order to obtain a definite allocation of the address signal and the code associated with the relevant product 52. It is also possible for several codes to be combined with a specific group of products for example, through the converters 64, in order to obtain a single address signal for a storage unit 30. The latter preferably includes a video disc or laser disc. The disc contains pieces of information associated with the products or group of products, and spot advertisements, customer information, applications, references to pertinent products, and the like. Upon being called up by the reading device 56, these pieces of information are passed on to the output unit 32 and are presented to the customer visually and/or acoustically.

The wireless transmission system may operate, in particular, with radio-waves, e.g. in the VHF frequency range, with ultrasound or with infrared radiation. Transmission systems of this kind are noted for their great reliability and, if modern micro-electronics are used, they are extremely compact and light. This is particularly important if the reading device 56 is in the form of a scanning gun.

Figure 2:
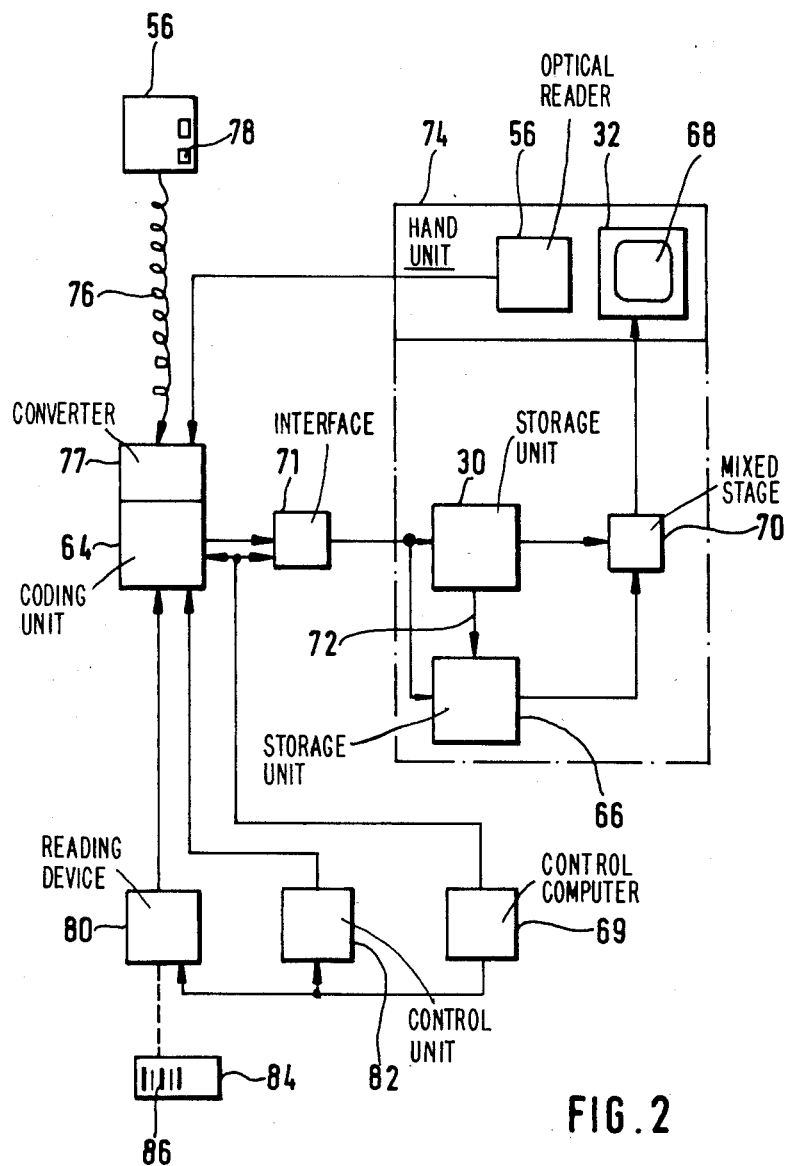
FIG. 2 is a view similar to that of FIG. 1 but of a second embodiment wherein an additional storage unit is provided for audio signals.

FIG. 2 illustrates another embodiment of the invention in which an additional storage unit 66 is associated with the storage unit 30. If the output unit 32 is a television set, or monitor, having a screen 68, additional text or audio signals are stored through the additional storage unit 66, and the latter may be in the form of a cassette recorder of conventional type. It is a simple matter also to feed text-tie-ins, especially regarding new products, altered performance data, etc. into this storage unit, thus imparting to the apparatus a high degree of flexibility and adaptability to varying marginal conditions. Signals from this additional storage unit 66 are fed to a mixer stage 70 whence they are released by the output unit 32 and the monitor, either mixed with or time displaced with respect to the video information from the storage unit 30. A standardized interface 71, preferably a V-24 interface, precedes the storage unit 30 and the additional storage unit 66. Thus the storage units may be commercially available units, making it possible to keep investment costs low. Control and monitoring of the different units is effected by a central computer unit 69, more particularly a microprocessor.

The additional storage unit 66 may also serve as intermediate storage for audio signals stored on a laser video disc in the storage unit 30. It is known that, according to television standards, audio signals can be recorded in parallel with video signals, if necessary, also on two sound tracks for stereo-sound reproduction. If only one sound track (mono-reproduction) is used for the video sequences the audio signals for still pictures can be stored on the second sound track. As indicated by a connection 72, when a video sequence is being played the latter audio signals are fed to the additional storage unit 66 which now functions as an intermediate storage unit. If a still picture is then called up from the storage unit 30, a signal is simultaneously released to the additional storage unit 66, in order to call up the audio signals associated with the still picture. In an alternative and important embodiment, the audio signals are stored in lines between individual pictures or half pictures. The signal density of such intermediate lines is considerably greater than in the above mentioned parallel sound tracks and stereo reproduction is easily made possible.

It may also be gathered from FIG. 2 that the reading device 56 and the output unit 32 are combined to form a compact hand unit 74. In addition to this, the storage unit 30 and the additional storage unit 66 may also be included in one unit, as indicated by the broken lines. Modern electronic memories, for example bubble memories combine high storage capacity with extremely small volume and weight, so that even large amounts of information may be stored directly in the storage unit of the hand unit. This embodiment has the special advantage that, if several such reading devices are used, several customers can call up the desired information simultaneously without interfering with each other. Release of the information called up is easily effected by means of a small screen 68, measuring only a few centimeters diagonally, and/or a miniature loud-speaker.

The code transmission from the reading device to the data processing unit and to coding unit 64 can also be obtained through a line 76. This line may be an electrical conductor or an optical fibre cable for direct optical transmission. If an optical fibre cable is used, the product bar codes, detected by the optical reading device 56, can be passed, at extremely low cost, directly to the data processing unit and to coding unit 64. Conversion to electrical signals takes place in a converter 77 preceding coding unit 64. Optical reading devices of this kind are noted for particularly their small weight and simple handling.

The reading device 56 also contains control means 78 in the form of two switches or keys. Accordingly, the storage unit 30 is switched on directly by these control means, so that other pieces of information are released to the output unit 32 or screen 68. Thus a user can actively control the release of information through the control means 78 in a surprisingly simple manner; he can return to information already offered, or he can skip information which is less meaningful to him.

A particularly interesting development may be obtained by means of reading device 80 in conjunction with a control unit 82. The input and, if necessary any changes to existing allocations between coding and address signal, is very simple. If a new product 84 is to be included, the relevant code 86 is passed on to the coding unit 64 through the reading device 80. Assuming that the coding unit already contains a suitable spot advertisement or a serviceable piece of information, the storage unit is activated by the control unit 82. Accordingly, the known address signal can be fed directly through the control unit, for example by means of keys. Alternatively, the storage unit 30 can be started up with control unit 82, through the coding unit 64, in such a manner that the pieces of information can be offered consecutively, if necessary in rapid sequence also, on the output unit 32. If the desired piece of information is finally offered, the control unit 82 shuts off the interrogation of the coding unit 64 and the allocation to the code 86 is carried out and stored. The coding unit according to the invention comprises a plurality of storage locations for the address signals which can also be occupied even subsequently in the manner explained, without any difficulty. Even when including new products, which are comparable with other products of the same kind, the storage medium and storage unit 30 may be retained unchanged. This provides considerable advantages when the apparatus according to the invention is used.

I claim:

1. An apparatus for storing and retrieving information associated with various coded items, said apparatus comprising:
    (a) a reading device for reading codings associated with individual items to produce coding signals;
    (b) a storage unit for storing information associated with individual items at respective storage addresses each accessible through a corresponding address signal;
    (c) a data processing unit for receiving coding signals read by said reading device and transmitting address signals to said storage unit to retrieve stored information from the corresponding storage addresses, wherein at least one address signal has more than one coding signal at one time associated therewith, and wherein said data processing unit comprises a coding unit which in response to receipt of at least one coding signal produces an associated address signal for transmission to said storage unit, and said coding unit is selectively reprogrammable to change at least one coding signal associated with the address signal corresponding to any desired storage address of said storage unit while maintaining the address signal unchanged; and
    (d) an output unit for making retrieved information avaiable to a user of the apparatus.

2. An apparatus according to claim 1, wherein said reading device includes control means for retrieving additional information from said storage unit.

3. An apparatus according to claim 1, wherein to establish or change an association between a given item and selected stored information, a new coding signal corresponding to a code associated with said given item is stored in the coding unit in association with a previously sotred address signal corresponding to the storage address of said selected information.

4. An apparatus according to claim 1, wherein a control unit is provided to associate a coding signal corresponding to a coding read by said reading device with an address signal selected by said control unit, and to cause the associated coding signal and address signal to be subsequently stored together in said coding unit.

5. An apparatus according to claim 1, further comprising a second reading device and a control unit operatively connected to said coding unit for associating a coding signal corresponding to a coding associated with a given item with an address signal corresponding to the storage address of selected stored information.

6. An apparatus according to claim 1, wherein said coding unit comprises at least one programmable converter including means for detecting a coding signal corresponding to a coding associated with at least one item and for converting the detected coding signal into an associated address signal corresponding to the storage address of information in said storage unit.

7. An apparatus for storing and retrieving information associated with various coded items, said apparatus comprising:
    (a) a reading device for reading coding associated with individual items to produce coding signals;
    (b) a storage unit for storing information associated with individual items at respective storage addresses each accessible through a corresponding address signal, wherein the information stored at each storage address in said storage unit is fixed and unchangeable;
    (c) a data processing unit for receiving coding signals read by said reading device and transmitting address signals to said storage unit to retrieve stored information from the corresponding sotrage addresses, wherein said data processIng unit comprises a coding unit which in response to receipt of at least one coding signal produces an associated address signal for transmission to said storage unit, and said coding unit is selectively reprogrammable to change at least one coding signal associated with the address signal corresponding to any desired storage address of said storage unit while maintaining the address signal unchanged; and
    (d) an output unit for making retrieval information avaialbe to a user of the apparatus.

8. An apparatus according to claim 7, further comprising a supplemental storage unit containing additional or altered information which can be retrieved for transmission to said output unit.

9. An apparatus according to claim 8, wherein said information contained in said supplemental storage unit comprises audio information which, when retrieved, is transmitted to a loudspeaker in said output unit.

10. An apparatus according to claim 9, wherein said information is transmitted through a mixer stage to said output unit.

11. An apparatus according to claim 8, wherein said supplemental storage unit constitutes an intermediate memory for holding information from a main storage unit during presentation of a sequence of pictures through said output unit and releasing the held information to the output unit when a still picture is shown.

12. An apparatus according to claim 11, comprising means for storing information to be held in said intermediate memory on a sound track in parallel with the pictures of a picture sequence in said main storage unit.

13. An apparatus according to claim 11, comprising means for storing information to be held in said intermediate memory in individual parts between the pictures or half pictures of a picture sequence in said main storage unit.

* * * * *